(12) United States Patent
Tsukada (10) Patent No.: US 10,698,643 B2
(45) Date of Patent: Jun. 30, 2020

(54) APPARATUS AND METHOD FOR FORMING IMAGE FOR THE SAME

(71) Applicant: CANON KABUSHIKI KAISHA, Tokyo (JP)

(72) Inventor: Yoshihiro Tsukada, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/162,255

(22) Filed: Oct. 16, 2018

(65) Prior Publication Data

US 2019/0114123 A1  Apr. 18, 2019

(30) Foreign Application Priority Data

Oct. 18, 2017 (JP) .................................. 2017-202095

(51) Int. Cl.
G06F 3/12 (2006.01)
G06K 15/02 (2006.01)
H04N 1/00 (2006.01)

(52) U.S. Cl.
CPC ............ *G06F 3/1248* (2013.01); *G06F 3/122* (2013.01); *G06F 3/1205* (2013.01); *G06F 3/1209* (2013.01); *G06F 3/1246* (2013.01); *H04N 1/0097* (2013.01)

(58) Field of Classification Search
None
See application file for complete search history.

(56) References Cited

U.S. PATENT DOCUMENTS

| | | | | |
|---|---|---|---|---|
| 2003/0101324 A1* | 5/2003 | Herr | ........................ | G06F 5/065 711/170 |
| 2004/0165213 A1* | 8/2004 | Han | ...................... | G06F 3/1205 358/1.15 |
| 2008/0291496 A1* | 11/2008 | Hara | ...................... | G06K 15/02 358/1.16 |
| 2009/0254917 A1* | 10/2009 | Ohtani | .................. | G06F 9/5027 718/104 |
| 2010/0091318 A1* | 4/2010 | Ferlitsch | ............... | G06F 3/1204 358/1.15 |
| 2010/0123926 A1* | 5/2010 | Kitani | .................... | G06K 15/02 358/1.15 |
| 2011/0149347 A1* | 6/2011 | Sato | ...................... | G06K 15/401 358/1.16 |
| 2016/0210093 A1* | 7/2016 | Kanai | ................... | G06F 3/1248 |
| 2019/0050695 A1* | 2/2019 | Kumahashi | ........... | G06F 3/1248 |

FOREIGN PATENT DOCUMENTS

| | | | | |
|---|---|---|---|---|
| JP | 2008143067 | * | 6/2008 | ............. G06F 3/122 |
| JP | 2016-132116 A | | 7/2016 | |

* cited by examiner

*Primary Examiner* — Beniyam Menberu (74) *Attorney, Agent, or Firm* — Canon U.S.A., Inc. IP Division (57) ABSTRACT

An image forming apparatus includes a interpretation unit, a memory control unit, and an execution unit. The interpretation unit is configured to interpret print data described in a page description language. The memory control unit is configured to control allocation a memory area to the interpretation unit. The execution unit is configured to execute printing by making the interpretation unit to which the memory area is allocated interpret the print data. The memory control unit releases the allocated memory area according to a time elapsed after the print data is interpreted without at least interpretation of print data being performed using the interpretation unit to which the memory area is allocated.

11 Claims, 7 Drawing Sheets

APPARATUS AND METHOD FOR FORMING IMAGE FOR THE SAME

BACKGROUND OF THE INVENTION

Field of the Invention

The present disclosure relates to a technique for allocating a memory area to an interpretation unit that interprets print data described in a page description language.

Description of the Related Art

Various page description languages (hereinafter referred to as "PDL") are known which is used by a computer to issue a drawing instruction to an image forming apparatus, such as a printer. Typical examples of the PDL include the laser beam printer image processing system (LIPS), Postscript (PS), Portable Document Format (PDF), Printer Command Language (PCL), and Extensible Markup Language (XML) Paper Specification (XPS).

Recent image forming apparatuses support printing in a plurality of PDL types. These image forming apparatuses are capable of interpreting drawing instructions described in the supported PDL types and create page data (bitmap data) based on the interpreted drawing instructions. Furthermore, these image forming apparatuses perform printing based on the created page data.

Japanese Patent Laid-open No. 2016-132116 discloses an image forming apparatus that includes PDL processing modules for the supported PDL types and that activates only a limited PDL processing module among the PDL processing modules. Upon receiving PDL data (print data) from a computer via a network, such as a local area network (LAN), the image forming apparatus activates only a PDL processing module capable of interpreting the PDL data. In the activation of the PDL processing module, a memory for a work area to be used by the PDL processing module is reserved (allocated). If a PDL processing module that cannot interpret the PDL data is activated, the PDL processing module is inactivated (the allocated memory is released), and then a necessary PDL processing module is activated. The inactivation and activation is referred to as switching between PDL processing modules. This switching between PDL processing modules saves the memory as compared with a case in which a memory for all the PDL processing modules is reserved. Upon completion of the interpretation of the print data, the image forming apparatus releases the memory reserved for the used PDL processing module.

In Japanese Patent Laid-open No. 2016-132116, upon completion of interpretation of print data, the memory reserved for the PDL processing module is released.

SUMMARY OF THE INVENTION

The present disclosure provides an image forming apparatus including a first interpretation unit configured to interpret print data described in a page description language, a memory control unit configured to control allocation a memory area to the first interpretation unit, and an execution unit configured to execute printing by making the first interpretation unit to which the memory area is allocated interpret the print data, wherein the memory control unit releases the allocated memory area according to a time elapsed after the print data is interpreted without at least interpretation of print data being performed using the first interpretation unit to which the memory area is allocated.

Further features of the present invention will become apparent from the following description of exemplary embodiments with reference to the attached drawings.

DESCRIPTION OF THE EMBODIMENTS

Embodiment

An image forming apparatus according to an embodiment of the present disclosure will be described hereinbelow. However, the components described in the embodiment are mere examples and are not intended to limit the scope of the present disclosure. Not all of the combinations of the components described in the embodiment are absolutely necessary.

Figure 1:
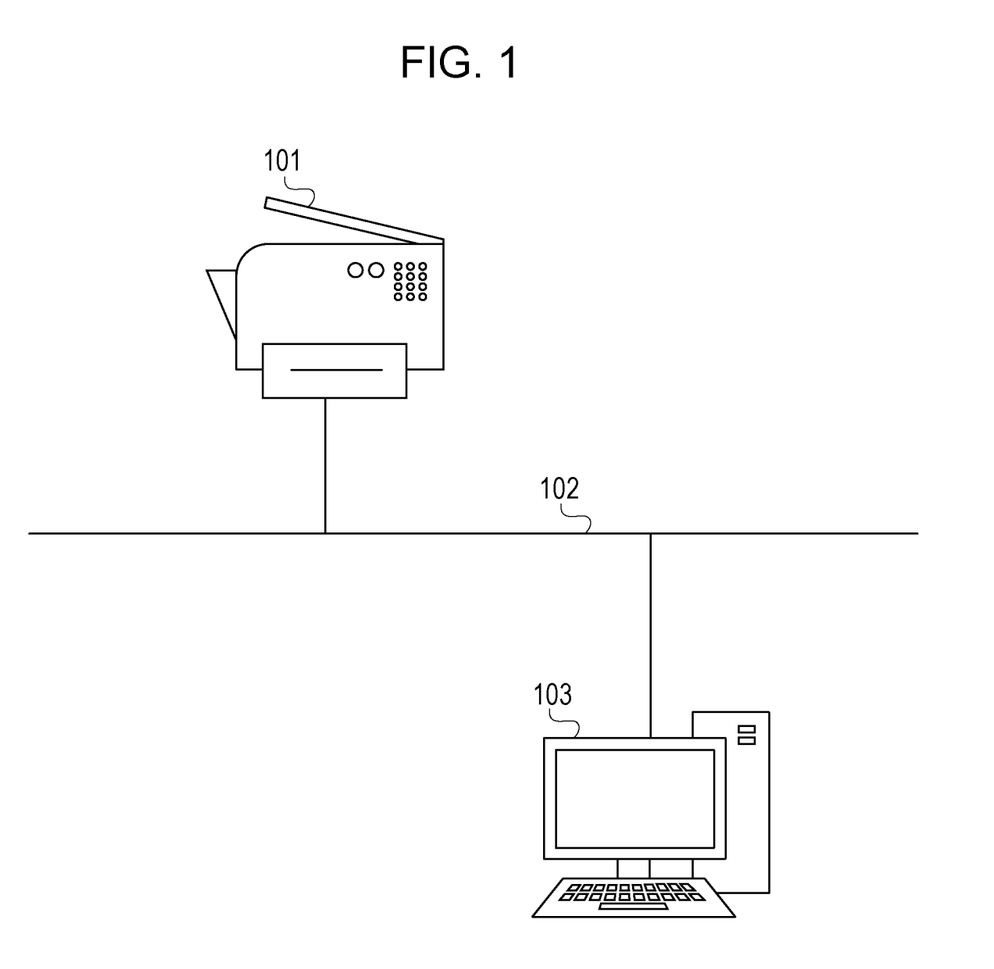
FIG. 1 is a diagram illustrating the system configuration of the present embodiment.

FIG. 1 illustrates an example of the system configuration of the present embodiment. An image forming apparatus 101 is connected to a computer 103, such as a host personal computer (PC), via a network 102, such as a local area network (LAN). The host PC 103 creates PDL data to be printed (print data) using a printer driver of the image forming apparatus 101 and transmits the PDL data to the image forming apparatus 101 via the network 102. Upon receiving the PDL data, the image forming apparatus 101 determines the type of the page description language (PDL) that describes the PDL data, interprets the PDL data using a PDL processing module corresponding to the PDL type, and prints the PDL data. The image forming apparatus 101 has a function called media print, as will be described later. This function is a function for printing PDL data, such as a PDF file and an XPS file, stored in a universal serial bus (USB) memory attached to the image forming apparatus 1. When using this function, the user first presses a predetermined button (a media print button) displayed on the home screen of the control panel of the image forming apparatus 101 (see FIG. 4). Then, the image forming apparatus 101 displays a printable file list stored in the USB memory on the control panel. The user selects a file to be printed via the control panel and gives an instruction to execute printing. The image forming apparatus 101 determines the type of the PDL describing the file to be printed (PDL data), interprets the PDL data using a PDL processing module corresponding to the PDL type, and prints the file.

When a necessary PDL processing module is inactivated, the image forming apparatus 101 inactivates an activated PDL processing module and activates the necessary PDL processing module (and PDL processing modules of the same group of the PDL processing module). In other words, only some PDL processing modules are activated. Such switching between the PDL processing modules takes about one second.

The image forming apparatus 101 of the present embodiment interprets PDL data using an activated PDL processing module and prints the PDL data. The activated PDL processing module can be less frequently used than the PDL processing module inactivated to switch between the PDL processing modules. In other words, a PDL processing module (a specific PDL processing module) that is more frequently used than the activated PDL processing module can be inactivated. In this case, activating the specific PDL processing module after completion of printing using the activated PDL processing module saves the time taken to activate the specific PDL processing module after PDL data corresponding to the specific PDL processing module is received.

However, when a plurality of pieces of PDL data corresponding to the specific PDL processing module are continuously received, the activation of the specific PDL processing module immediately after completion of printing causes switching between the PDL processing modules every time printing of the PDL data is completed. This increases overhead due to the switching time, resulting in a decrease in productivity.

In the present embodiment, the specific PDL processing module is activated at a proper timing. The proper timing may be a timing when a predetermined time has passed without receiving (interpreting) another PDL data after completion of printing of PDL data. Alternatively, the proper timing may be a timing when a predetermined time has passed after switching between PDL processing modules is performed by a user operation via the control panel without receiving PDL data after the switching (without interpreting PDL data). Alternatively, for an image forming apparatus with a user authentication function, the proper timing may be a timing when a predetermined time has passed without receiving (interpreting) another PDL data after a log-out button displayed on the control panel after log-in is pressed by the user. In other words, the image forming apparatus 101 of the present embodiment activates the specific PDL processing module when a predetermined time has passed, with the image forming apparatus 101 kept in a predetermined state. The predetermined state is a state in which the PDL interpretation function (PDL processing module) of the image forming apparatus 101 is not in use. A specific example is a state in which the specific PDL processing module is inactivated, and another PDL processing module is activated, but PDL data has not been processed. In other words, the specific PDL processing module is activated when a predetermined time has passed without processing PDL data after a predetermined event (completion of a PDL-data print job or a user operation on the control panel involving switching between PDL processing modules) occurs.

The activation of a PDL processing module in the present embodiment means that the image forming apparatus 101 makes PDL data interpretable using the PDL processing module. If the PDL processing module is a program, the activation may be to execute the program to allocate a work area. If the program of the PDL processing module is started when the power of the image forming apparatus is turned on, the activation may be to allocate a work memory to be used in interpreting PDL data according to the program. An another alternative is to read a character font resource or the like for use in interpreting PDL data according to the program into a work memory. In the present embodiment, the work memory is also referred to as a work area, a work memory area, or a heap memory.

The inactivation of a PDL processing module in the present embodiment means that the image forming apparatus 101 makes PDL data uninterpretable using a PDL processing module. If the PDL processing module is a program, the inactivation may be to terminate the program. If the program of the PDL processing module is continuously operated after the power of the image forming apparatus 101 is turned on, the inactivation may be to release a work memory to be used in interpreting PDL data according to the program. Another alternative is to delete a character font resource for use in interpreting PDL data according to the program from a work memory.

Inactivating one PDL processing module and activating another PDL processing module in the present embodiment is referred to as switching between the PDL processing modules.

Figure 2:
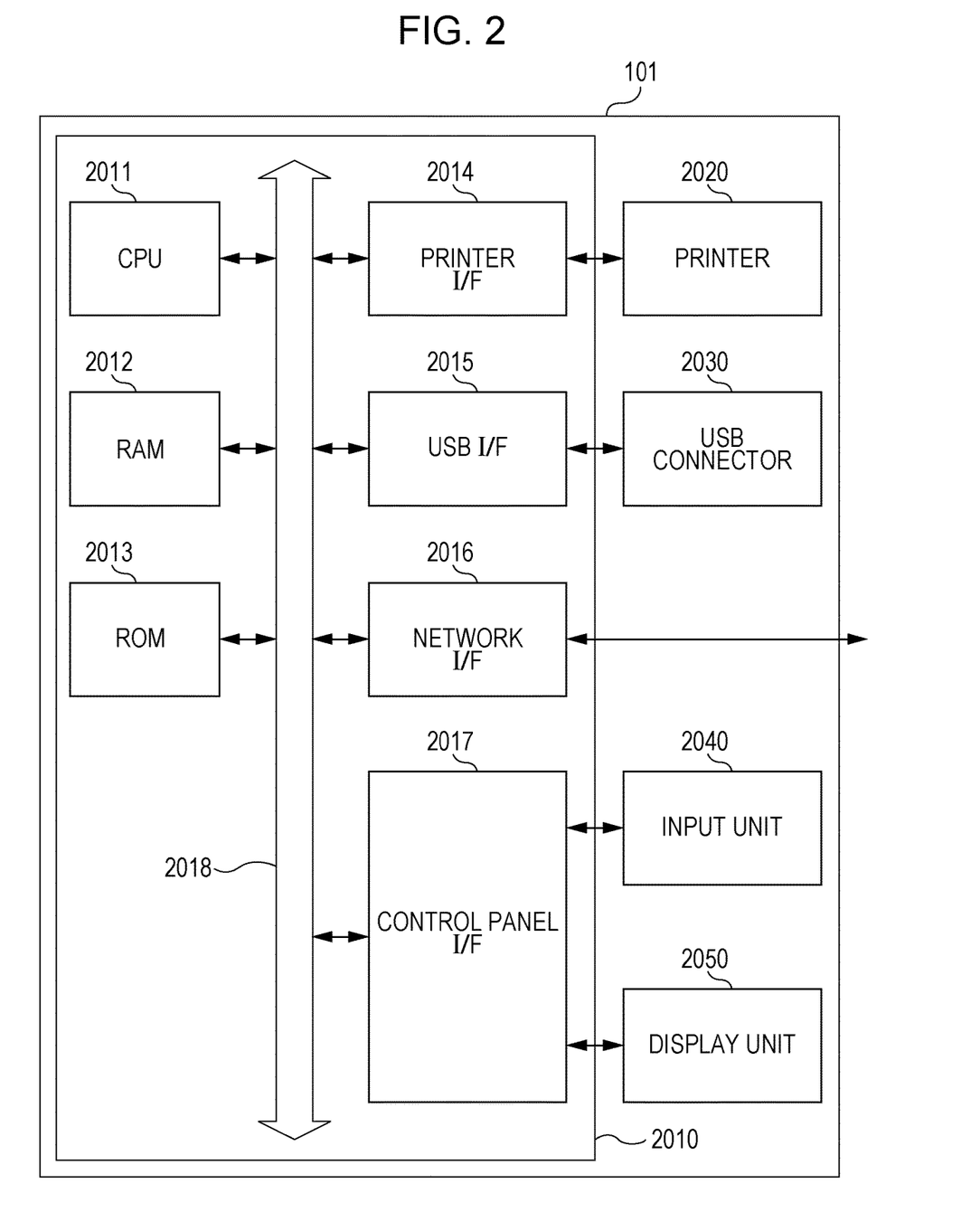
FIG. 2 is a diagram illustrating the hardware configuration of an image forming apparatus according to an embodiment of the present disclosure.

FIG. 2 illustrates an example of the hardware configuration of the image forming apparatus 101 in the present embodiment.

A control unit (controller) 2010 including a CPU 2011 controls the operation of the entire image forming apparatus 101.

The CPU 2011 is a central processing unit. All of software modules described with reference to FIG. 3 operate in the CPU 2011. The CPU 2011 controls the components of the image forming apparatus 101 via a system bus 2018.

A RAM 2012 is a random access memory that the CPU 2011 can access. The RAM 2012 is for use as a work memory (a work memory area or a memory area) necessary for operating software, to be described later.

Figure 3:
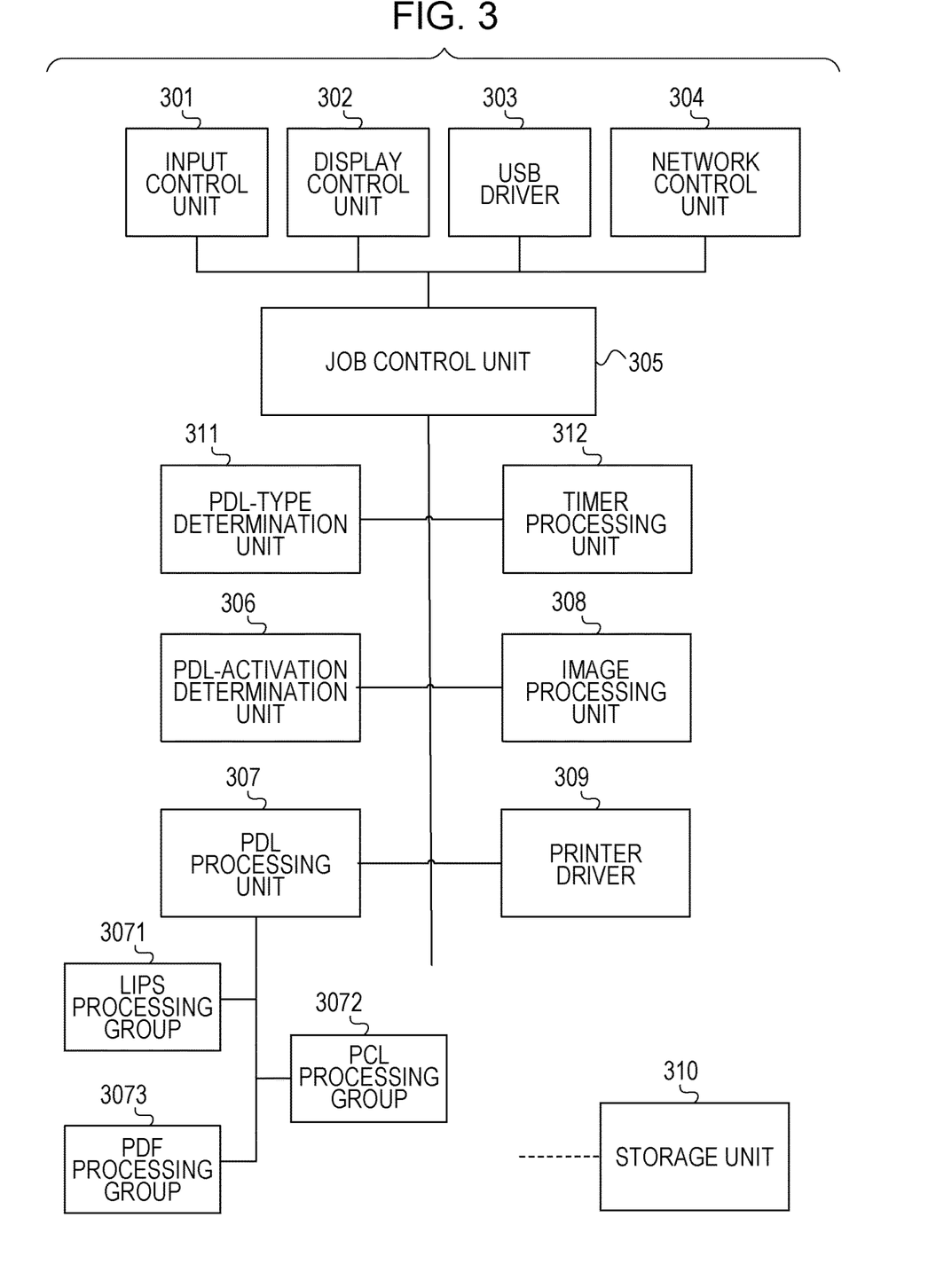
FIG. 3 is a diagram illustrating the software module configuration of the image forming apparatus of the present embodiment.

A ROM 2013 is a read only memory. The software modules described with reference to FIG. 3 are stored in the ROM 2013 and are read by the CPU 2011 for execution.

A printer I/F 2014 connects a printer 2020 (a printer engine) and the control unit 2010 together. The printer I/F 2014 serves as an interface for outputting image signals to the printer 2020.

A USB I/F 2015 connects a USB connector 2030 and the control unit 2010 together.

A network I/F 2016 connects an external network to the control unit 2010.

A control panel I/F 2017 connects an input unit 2040 to the control unit 2010 and a display unit 2050 to the control unit 2010. The input unit 2040 is a touch panel that accepts a user touch operation. The display unit 2050 is a liquid crystal display that displays a screen. A control panel, which is a user interface of the image forming apparatus 101, includes a touch screen including the input unit 2040 and the display unit 2050.

FIG. 3 illustrates an example of the software module configuration of the image forming apparatus 101 in the present embodiment.

An input control unit 301 controls the input unit 2040. The input control unit 301 waits for an instruction input from the user via the control panel and notifies the other function parts, such as a job control unit 305, of the details of the accepted instruction.

A display control unit 302 displays a home screen including an operation menu and the result of instruction on the display unit 2050 (the control panel) according to an instruction from the other function part.

A USB driver 303 controls the USB I/F 2015. The USB driver 303 inputs and outputs PDL data and so on between the image forming apparatus 101 and a USB memory according to an instruction from the other function part.

A network control unit 304 controls the network I/F 2016 to receive data, such as PDL data, from an external computer, such as a PC or a smartphone, via the network I/F 2016.

The job control unit 305 creates a job in response to a notification of a user instruction from the input control unit 301 or a notification of PDL data from the network control unit 304 and processes the created job. The job control unit 305 processes the created job in a certain order by issuing an instruction to the other function parts at a proper timing. The job control unit 305 issues an instruction to start the other function parts when the power of the image forming apparatus 101 is turned on. The job control unit 305 notifies a PDL-activation determination unit 306 of the PDL type and instructs a PDL processing unit 307 to activate a PDL processing module corresponding to the PDL type determined by the PDL-activation determination unit 306. The job control unit 305 stores activated-PDL information indicating which PDL processing module (which PDL processing module group) is activated in the RAM 2012. Upon detecting occurrence of a predetermined event, the job control unit 305 causes a timer processing unit 312 to determine whether a predetermined time has passed.

The PDL-activation determination unit 306 determines whether the PDL processing module corresponding to the PDL type notified from the job control unit 305 is activated at present and returns the determination result to the job control unit 305. For example, the PDL-activation determination unit 306 may specify a PDL processing module corresponding to the target PDL type and may determine whether the PDL processing module has been activated with reference to the activated-PDL information stored in the RAM 2012.

The PDL processing unit 307 function as a memory control unit that controls allocation of the memory area. The PDL processing unit 307 manages PDL processing groups (a LIPS processing group 3071, a PCL processing group 3072, and a PDF processing group 3073) for interpreting PDL data. The PDL processing unit 307 releases a work memory allocated for a PDL processing group activated at that time according to an instruction from the job control unit 305 to activate the PDL processing module. Thus, the PDL processing modules of the PDL processing group are inactivated. In other words, the PDL processing unit 307 makes it impossible to interpret the PDL data with the PDL processing modules. Thereafter, the PDL processing unit 307 reserves a work memory for a PDL processing group to which the PDL processing module designated by the job control unit 305 belongs. Thus, the PDL processing modules in the PDL processing group are activated. In other words, the PDL processing unit 307 makes it possible to interpret the PDL data with the activated PDL processing modules. At that time, the PDL processing unit 307 notifies the job control unit 305 that switching between the PDL processing modules has been completed. The PDL processing unit 307 interprets a drawing instruction in the PDL data using a proper module of the activated PDL processing modules according to the instruction from the job control unit 305. The PDL processing unit 307 creates page data (page bitmap) using a drawing module (not illustrated) based on the data obtained by the interpretation. This interpretation and creating process is hereinafter referred to as a PDL process.

In the present embodiment, processing modules that uses a common drawing module are grouped. Specifically, the PDF processing group 3073 includes a PS processing module (a module for interpreting PDL data based on PS) and a PDF processing module (a module for interpreting PDL data based on PDF). Since a drawing module for PS data is used for drawing PDF data, the PS processing module and the PDF processing module are grouped together. The LIPS processing group 3071 includes a LIPS processing module (a module for interpreting PDL data based on LIPS). The PCL processing module 3072 includes a PCL processing module (a module for interpreting PDL data based on PCL) and an XPS processing module (a module for interpreting PDL data based on XPS).

The grouping of the PDL processing modules in the present embodiment is given for illustration, and any grouping according to the embodiment can be made. Information indicating which PDL processing modules belong to the same group is stored from the ROM 2013 to the RAM 2012 when the power is turned on.

An image processing unit 308 performs image processing, such as calibration and color conversion, on image data, such as Joint Photographic Experts Group (JPEG) data, and page data created by the PDL processing unit 307.

A printer driver 309 controls the printer I/F 2014. The printer driver 309 performs a printing process (a process for converting page data processed by the image processing unit 308 to an image signal that can be processed by the printer 2020 and transmitting the image signal to the printer 2020 via the printer I/F 2014) according to an instruction from the job control unit 305.

A storage unit 310 writes designated data into the RAM 2012 or the ROM 2013 or reads stored data therefrom according to instructions from the other function parts. The dotted line in FIG. 3 means that the storage unit 310 is connected to all the other function parts. In the present embodiment, in particular, a PDL-processing-group preparation completion flag 901 is written or read according to an instruction from the job control unit 305 or a PDL-type determination unit 311. PDL information that is set by the user by the operation on the input control unit 301 and the count value of jobs submitted by the user using the job control unit 305 are also stored in the ROM 2013 and can be used to specify a specific PDL type.

The PDL-type determination unit 311 determines the type of PDL data received from the network control unit 304 according to an instruction from the job control unit 305. The PDL-type determination unit 311 sends the determined PDL type back to the job control unit 305. If a character string of %!PS is present at the head of the PDL data, the PDL-type determination unit 311 determines that the PDL data is PS data (PS) and sends the determination back to the job control unit 305. The type of the PDL may be determined from the extension of the name of the file received as the PDL data or by analyzing the header of the PDL data. The job control unit 305 notifies the PDL-activation determination unit 306 of the PDL type determined by the PDL-type determination unit 311.

The timer processing unit 312 determines whether a predetermined time has passed according to an instruction from the job control unit 305. For example, upon detecting the end of the job, the job control unit 305 instructs the timer processing unit 312 to determine whether the predetermined time has passed. An example of the predetermined time is five minutes. Upon detecting that the predetermined time has passed, the timer processing unit 312 notifies the job control unit 305 of the fact. Upon receiving the notification, the job control unit 305 notifies the PDL-activation determination unit 306 of the specific PDL type.

Figure 4:
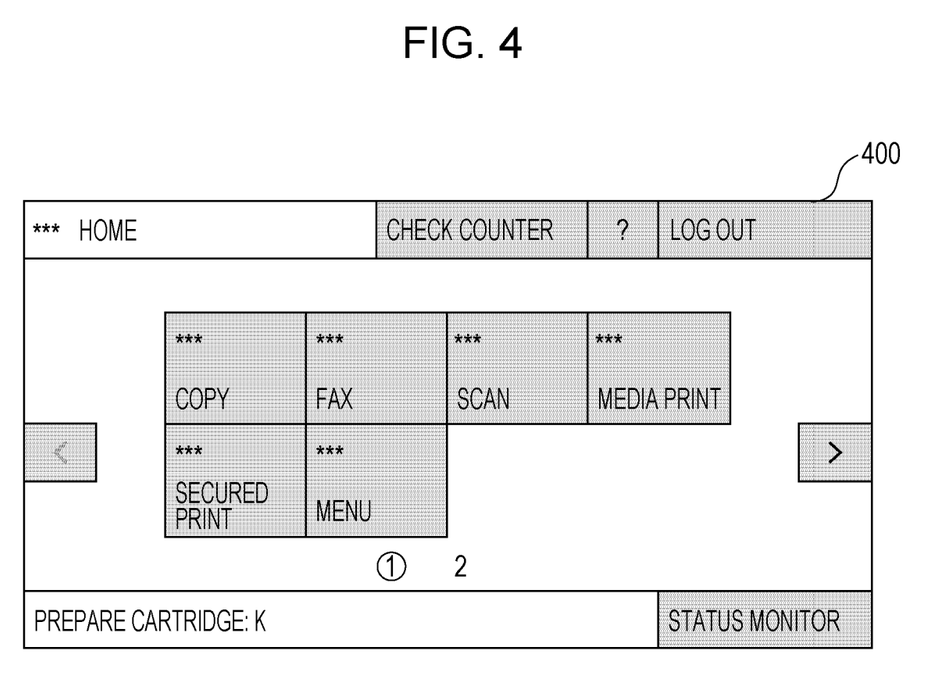
FIG. 4 is a diagram illustrating an example of a home screen displayed on the control panel of the image forming apparatus in the present embodiment.

FIG. 4 illustrates an example of a home screen (also referred to as "start screen") 400 of the image forming apparatus 101 in the present embodiment. The home screen 400 displays buttons of functions (copy, fax, scan, and so on) that can be executed by the image forming apparatus 101. The user can select a desired function by pressing a predetermined button. This home screen displays "media print button" as described above, so that PDL data stored in the USB memory can be printed. In an image forming apparatus with a user authentication function, the home screen displays "log-out button" as described above, so that the user can log out from the image forming apparatus by pressing the button. The logged-out image forming apparatus cannot accept an instruction to print PDL data from the user via the control panel.

Although in the present embodiment a touch-screen-type control panel that is operated by the user touching the screen directly is assumed as a user interface of the image forming apparatus 101, the touch screen is not an absolutely necessary component of the present disclosure.

Figure 5:
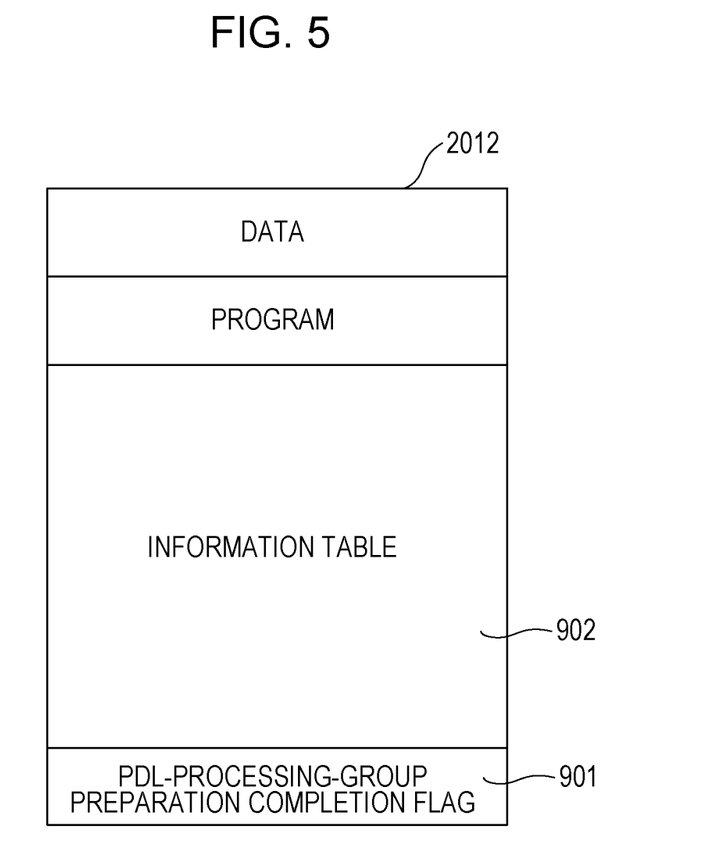
FIG. 5 is a diagram illustrating an example of data in the RAM of the image forming apparatus in the present embodiment.

FIG. 5 is a diagram illustrating an example of the data in the RAM 2012 of the image forming apparatus 101 in the present embodiment. The PDL-processing-group preparation completion flag 901 is a flag indicating whether the PDL processing group can start PDL processing, in which one of two values indicating "prepared" and "unprepared" is stored. The value of "unprepared" is written to the PDL-processing-group preparation completion flag 901 by the job control unit 305 at a timing when the job control unit 305 instructs the PDL processing unit 307 to switch between the PDL processing modules. The value of "prepared" is written to the PDL-processing-group preparation completion flag 901 by the job control unit 305 when the job control unit 305 receives a notification that switching between PDL processing modules is completed from the PDL processing unit 307. An information table 902 includes a table that stores group member information indicating which PDL processing module belongs to which PDL processing group.

Figure 6:
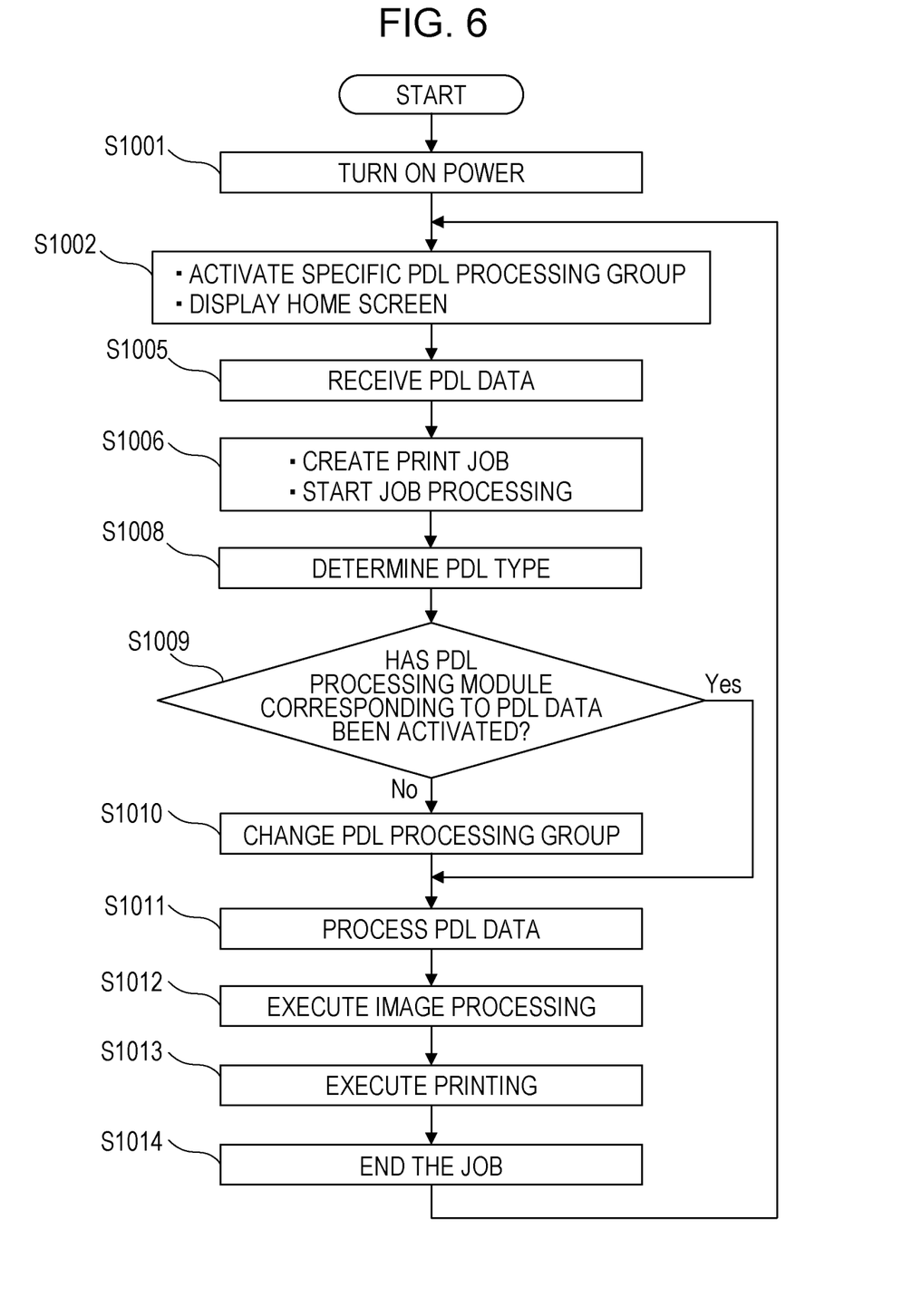
FIG. 6 is a flowchart for printing PDL data with the image forming apparatus of the present embodiment.

FIG. 6 is a flowchart for printing PDL data with the image forming apparatus 101 of the present embodiment.

When a power switch (not illustrated) that the user of the image forming apparatus 101 can operate is turned on (S1001), the job control unit 305 instructs the PDL processing unit 307 to activate a specific PDL processing module. The PDL processing unit 307 activates the PDL processing modules of a group that the specific PDL processing module belongs according to the instruction from the job control unit 305 (S1002). In the present embodiment, the group of the specific PDL processing module is referred to as a prescribed PDL processing group, and the LIPS processing group 3071 is predetermined as the prescribed PDL processing group. The PCL processing group 3072 and the PDF processing group 3073 are not activated. The display control unit 302 displays the home screen 400, which is a standby screen after the power is turned on, according to an instruction from the job control unit 305 (S1002).

When the network control unit 304 receives PDL data from an external computer via the network I/F 2016 (S1005), the job control unit 305 creates a print job based on the received PDL data and starts job processing (S1006). The job control unit 305 requests the PDL-type determination unit 311 to determine the PDL type of the PDL data and receives the result from the PDL-type determination unit 311 (S1008).

Subsequently, the job control unit 305 notifies the PDL-activation determination unit 306 of the PDL type received from the PDL-type determination unit 311 and receives a notification indicating whether PDL processing modules corresponding to the PDL type have been activated from the PDL-activation determination unit 306. The job control unit 305 determines whether the PDL processing modules corresponding to the PDL data have been activated according to the notification (S1009).

If the PDL processing modules corresponding to the PDL data have been activated (Yes in S1009), the job control unit 305 instructs the PDL processing unit 307 to interpret the received PDL data. Then, the PDL processing unit 307 processes the PDL data using a proper module among the activated PDL processing modules (S1011). In contrast, if PDL processing modules corresponding to the PDL data have not been activated (No in S1009), the job control unit 305 instructs the PDL processing unit 307 to activate PDL processing modules corresponding to the PDL type of the received PDL data. Then, the job control unit 305 updates the activated-PDL information. Upon receiving the instruction, the PDL processing unit 307 inactivates the active PDL processing modules and activates the designated PDL processing module (and the other PDL processing modules in the group) (S1010). In other words, the PDL processing unit 307 switches between PDL processing modules to be activated. The job control unit 305 receives a notification that activation has been completed from the PDL processing unit 307 and instructs the PDL processing unit 307 to interpret the PDL data. Then, the PDL processing unit 307 processes the PDL data using a proper module among the activated PDL processing modules (S1011).

Subsequently, the job control unit 305 instructs the image processing unit 308 to perform image processing on the page data obtained by processing the PDL data. The image processing unit 308 executes image processing, such as color conversion and dithering, on the page data created by the PDL processing unit 307 (S1012).

Next, the job control unit 305 instructs the printer driver 309 to perform printing, and the printer driver 309 outputs an image signal of the created page data to the printer 2020 via the printer I/F 2014 to execute printing (S1013). The job control unit 305 terminates the job processing (S1014).

Here, consider what happens after the job using the PDL module (in which a work memory is allocated) changed in S1010 ends. After completion of the job, PDL data of the same PDL type may be received subsequently. In preparation for that case, the work memory for the PDL module may be kept reserved for a while. In contrast, after completion of the job, a job using a PDL module may not be received for a while, or a user operation for executing a job using a PDL module may not be performed for a while. In those cases, the PDL module may be switched to a proper PDL module (a work memory for use in the PDL module may be reserved). The image forming apparatus of the present embodiment performs PDL module switching control (release and allocation of the work memory) using a predetermined timer. This control will be described with reference to FIG. 7.

Figure 7:
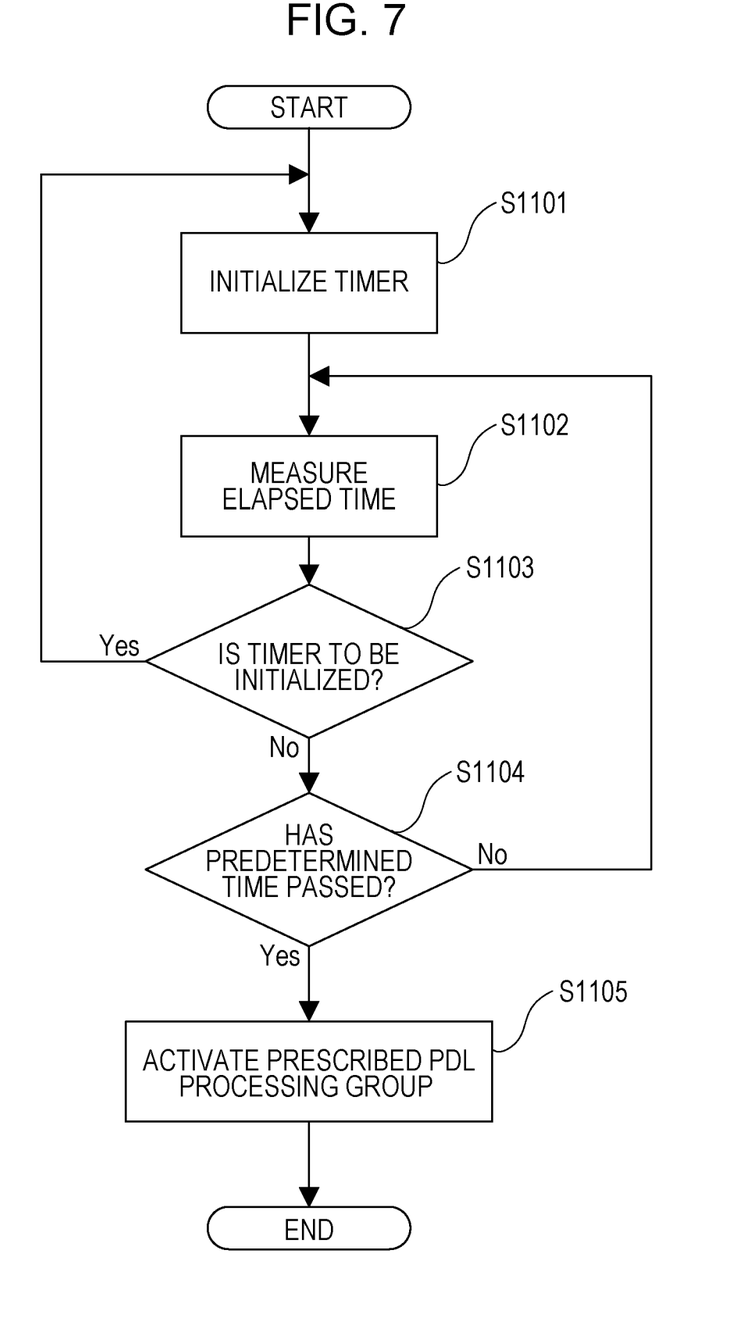
FIG. 7 is a flowchart for activation of a specific PDL processing module in the image forming apparatus of the present embodiment.

FIG. 7 is a flowchart for activation of a specific PDL processing module in the image forming apparatus 101 of the present embodiment. This process is started when a predetermined event, such as completion of the PDL-data job processing (S1014) or a user operation on the control panel, is detected by the job control unit 305.

The job control unit 305 instructs the timer processing unit 312 to initialize a predetermined tinier, and the timer processing unit 312 initializes the predetermined timer to 0

(S1101). The timer processing unit 312 measures a time elapsed from a predetermined event (S1102). The timer processing unit 312 of the present embodiment counts up a timer stored in the RAM 2012 in desired time units, for example, at one minute intervals, in the measurement of the elapsed time.

Next, the job control unit 305 determines whether an event for which the predetermined timer is initialized (an initialization event) has occurred (S1103). The job control unit 305 determines that an initialization event has occurred when an instruction to print (receive) new PDL data is detected (S1005), or when creation of a job for printing the PDL data is detected (S1006). Also when a user operation on the control panel, such as pressing of the media print button, is detected, the job control unit 305 determines that an initialization event has occurred. This is because it is assumed that the media print function will be used continuously.

Also when termination of PDL processing (S1011), termination of image processing (S1012), termination of printing (S1013), or termination of the job (S1014) is detected, the job control unit 305 determines that an initialization event has occurred. In other words, the job control unit 305 determines that an initialization event has occurred while PDL data is being printed (S1005 to S1014 in FIG. 3). Furthermore, the timer can be initialized when the user operates the input control unit 301 or when an external inquiry via the network control unit 304 or the USB driver 303 is given. When it is determined that such initialization events have occurred, the job control unit 305 instructs the timer processing unit 312 to initialize the predetermined timer (Yes in S1103, S1101).

If it is not detected that an initialization event has occurred, the job control unit 305 gives no instruction to the timer processing unit 312, and the process advances to S1104. The timer processing unit 312 determines whether the timer count has reached a predetermined value (for example, a value corresponding to five minutes, in other words, whether the elapsed time has exceeded a predetermined time, for example, five minutes). If the timer count has not reached the predetermined value, the process returns to S1102. If the timer count has reached the predetermined value, the tinier processing unit 312 notifies the job control unit 305 that the predetermined time has passed, and the process advances to S1105. The fact that the timer count has reached the predetermined value (the elapsed time has exceeded the predetermined time) is that a state in which the image forming apparatus does not perform printing of PDL data (PDL processing) continues for the predetermined time. In other words, the predetermined time has passed, with the image forming apparatus kept in a predetermined state. In such a case, the image forming apparatus 101 of the present embodiment activates the specific PDL processing module in the next step S1105.

The notified job control unit 305 instructs the PDL processing unit 307 to activate the specific PDL processing module. Then, (when the specific PDL processing module has not been activated), the PDL processing unit 307 inactivates the currently activated PDL processing module and activates a prescribed PDL processing group including the specific PDL processing module (S1105). The above process allows the specific PDL processing module to be activated in advance before PDL data is received. Since the specific PDL processing module is activates as the predetermined time passes, even if a plurality of pieces of PDL data (a plurality of jobs) of other PDL types are continuously processed, overhead due to frequent switching among PDL processing modules can be reduced.

Other Embodiments

In the above embodiment, the timer count is counted up. In another embodiment, when initializing the timer, the tuner processing unit 312 may set a predetermined value (a threshold time) to the timer and count down the tinier count. In this case, when the timer count becomes 0 or less, it is determined in S1104 as Yes, and when the timer count is greater than 0, it is determined as No. In still another embodiment, the following steps may be performed instead of S1101 to S1104 in FIG. 7. The timer processing unit 312 obtains a job processing end time from a real-time clock (RTC, not illustrated) and obtains a time (a switching time) by adding a predetermined time to the end time. If processing of another PDL data is not performed after the job processing ends, the timer processing unit 312 obtains a current time from the RTC at regular time intervals, and if the time exceeds the switching time, the timer processing unit 312 notifies the job control unit 305 that the predetermined time has passed.

In the above embodiment, the prescribed PDL processing group is an LIPS processing group. In another embodiment, the predetermined PDL processing group may be another PDL processing group or a PDL processing group set by the user. In still another embodiment, the number of prints of PDL data may be counted for each PDL type, and a PDL processing group including PDL processing modules of a PDL type with the greatest count value (that is most frequently used) may be the prescribed PDL processing group.

For example, the above embodiments disclose measures for preventing reduction in performance due to the time taken to release the memory every time interpretation of a continuously received plurality of pieces of print data to be interpreted by a PDL processing module is completed. In the embodiments, the memory area allocated to the PDL processing module can be released at a proper timing.

In the embodiments, an allocated memory area can be released according to a time elapsed without at least interpretation of print data using an interpretation unit to which the memory area is allocated being performed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (MID), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-202095, filed Oct. 18, 2017, which is hereby incorporated by reference herein in its entirety.

What is claimed is:

1. An image forming apparatus comprising:
one or more processors; and
at least one memory storing one or more programs including a first interpretation module configured to be executed by the one or more processors to interpret print data described in a first page description language and a second interpretation module configured to be executed by the one or more processors to interpret print data described in a second page description language, the one or more programs including executable instructions, which when executed by the one or more processors, cause the image forming apparatus to:
allot a memory area to the first interpretation module;
interpret the print data with the first interpretation module to which the memory area is allotted; and
in response to a predetermined time having elapsed since the first interpretation module last interpreted print data described in the first page description language, release the memory area allotted to the first interpretation module and allot a memory area to the second interpretation module even though print data described in the second page description language is not received.

2. The image forming apparatus according to claim 1, wherein the elapsed time is a time elapsed without the print data being interpreted by any of a plurality of interpretation modules including the first interpretation module of the image forming apparatus.

3. The image forming apparatus according to claim 1, wherein the memory area allotted to the first interpretation module is used as a work area by the first interpretation module to which the memory area is allotted.

4. The image forming apparatus according to claim 1, wherein the second interpretation module is a more frequently used interpretation module than the first interpretation module.

5. The image forming apparatus according to claim 1, wherein the second interpretation module is preset as a specified interpretation module.

6. A method for controlling an image forming apparatus, wherein the image forming apparatus includes at least one memory storing one or more programs including a first interpretation module configured to be executed by one or more processors to interpret print data described in a first page description language and a second interpretation module configured to be executed by the one or more processors to interpret print data described in a second page description language, the method comprising:
at the image forming apparatus:
allotting a memory area to the first interpretation module;
interpreting the print data with the first interpretation module to which the memory area is allotted; and
in response to a predetermined time having elapsed since the first interpretation module last interpreted print data described in the first page description language, releasing the memory area allotted to the first interpretation module and allotting a memory area to the second interpretation module even though print data described in the second page description language is not received.

7. The method according to claim 6, wherein the allotting a memory area to the second interpretation module is performed after the releasing the memory area allotted to the first interpretation module.

8. The method according to claim 6, wherein the elapsed time is a time elapsed without print data being interpreted by any of a plurality of interpretation modules including the first interpretation module.

9. The method according to claim 6, wherein the memory area allotted to the first interpretation module is used as a work area when the first interpretation module interprets print data.

10. The method according to claim 6, wherein the second interpretation module is a more frequently used interpretation module than the first interpretation module.

11. The method according to claim 6, wherein the second interpretation module is preset as a specified interpretation module.

* * * * *